United States Patent [19]

Zoric

[11] 4,232,709

[45] Nov. 11, 1980

[54] FOUR-WAY BALL VALVE

[75] Inventor: Michael T. Zoric, N. Versailles, Pa.

[73] Assignee: Westinghouse Air Brake Company, Wilmerding, Pa.

[21] Appl. No.: 953,146

[22] Filed: Oct. 20, 1978

[51] Int. Cl.³ .......................................... F16K 11/087
[52] U.S. Cl. .............................. 137/625.47; 251/289; 251/175
[58] Field of Search ...................... 137/625.47, 625.41, 137/625.22; 251/192, 315, 289, 175

[56] References Cited

U.S. PATENT DOCUMENTS

| | | | |
|---|---|---|---|
| 2,905,197 | 9/1959 | Janes | 137/625.47 |
| 3,192,943 | 7/1965 | Moen | 251/192 X |
| 3,223,111 | 12/1965 | Anderson | 251/315 X |
| 3,648,723 | 3/1972 | Nelson et al. | 251/315 X |
| 3,812,980 | 5/1974 | Kolb et al. | 251/289 X |
| 4,069,836 | 1/1978 | Sowinski | 251/289 X |

*Primary Examiner*—Arnold Rosenthal
*Attorney, Agent, or Firm*—R. S. Visk; R. W. McIntire, Jr.

[57] ABSTRACT

A four-way ball type valve including a spherical valve element operable to as many as four positions and which can be installed on a railway car in place of the branch pipe tee to eliminate the need for an angle cock at each end of the brake pipe and a brake control valve cut-out cock. The ball valve is functionally analogous to a rotary valve in cutting off the brake pipe at either end of the car without interrupting the brake control valve connection with the brake pipe, or in cutting out the brake control valve while establishing brake pipe continuity through the train.

3 Claims, 8 Drawing Figures

POSITION A

POSITION B

POSITION C

POSITION D

FOUR-WAY BALL VALVE

BACKGROUND OF THE INVENTION

The arrangement of shut-off valve devices on the brake pipe of a freight car normally includes an angle cock at the end of the car to open or close brake pipe communication between adjacent cars, and a cut-out cock interposed in a branch pipe leading to a brake control valve on the car and connected by a tee to the brake pipe, and cut-out cock serving to either open or cut out communication between the brake pipe and the brake control valve. It would be desirable to provide a single valve unit capable of performing the combined functions of the angle cock and cut-out cock.

In considering a possible valve device for accomplishing the object above noted, the concept of a four-way valve would serve the purpose, but the question remains as to which type of valve device, for example, spool, diaphragm, poppet, or ball, would best serve the purpose.

The spool type four-way valve is found objectionable because of restricted air flow capacity due to angled flow paths. To obtain sufficient flow capacity, the size of the valve device would have to be quite large and, therefore, impractical. Since the O-rings would have to be proportionately large, they would be susceptible to being blown out or dislodged from their grooves.

A diaphragm type valve device would entail undue complexities including three separate diaphragm covers, and because of the porting arrangement, would also result in poor flow capacity. Again, the flow capacity requirements would necessitate use of large diaphragms and, therefore, result in a larger than practical device.

The poppet type valve device would also be complex, characterized by poor air flow and having the same disadvantages as the diaphragm type construction. In addition, this type is susceptible to having foreign objects becoming lodged between the poppet valve seal and seat to cause undesirable leakage.

SUMMARY OF THE INVENTION

The object of the present invention, therefore, is to provide a four-way valve device characterized by uninterrupted and unrestricted air flow capacity and comprising a compact unit adaptable for replacing both the angle cock and cut-out cocks both structurally and functionally.

The invention comprises a ball and seal type valve device in which the ball element is operable to four positions by conventional keys from both sides of the car. The device may be installed in the brake pipe in place of the branch pipe tee to eliminate the need for an angle cock at the each end of the brake pipe and a control valve cut-out cock. The valve device is selectively operable to one of the four positions for (a) maintaining communication between both ends of the brake pipe and with the brake control valve, (b) cutting off one end of the brake pipe without interrupting the connection of the brake control valve, (c) cutting off the other end of the brake pipe without interrupting the connection of the brake control valve, or (d) cutting off connection with the brake control valve while maintaining continuity between the two ends of the brake pipe. The four-way valve device herein proposed is designed to use the floating ball principle, that is, in each of the four positions, the air pressure will always be working to seal the port connection closed off.

DESCRIPTION AND OPERATION

Figure 5:
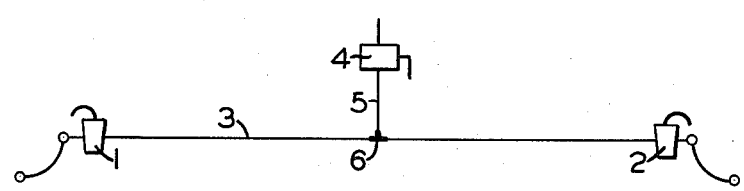
FIG. 5 is a schematic view of prior art showing the conventional arrangement of angle cocks and cut-out cock in a brake pipe and branch pipe, respectively, of a railway car.

FIG. 5, labeled PRIOR ART, schematically illustrates a conventional arrangement of angle cocks 1 and 2 mounted at opposite ends of railway car brake pipe 3 for controlling communication between brake pipes (not shown) on respective adjacent cars. A cut-out cock 4 is interposed in a branch pipe 5 connected at one end to brake pipe 3 by a pipe tee 6 and at the other end to a brake control valve device 7 (see FIG. 1A), said cut-out cock either communicating said control valve device with the brake pipe or cutting off communication therewith.

Figure 1A:
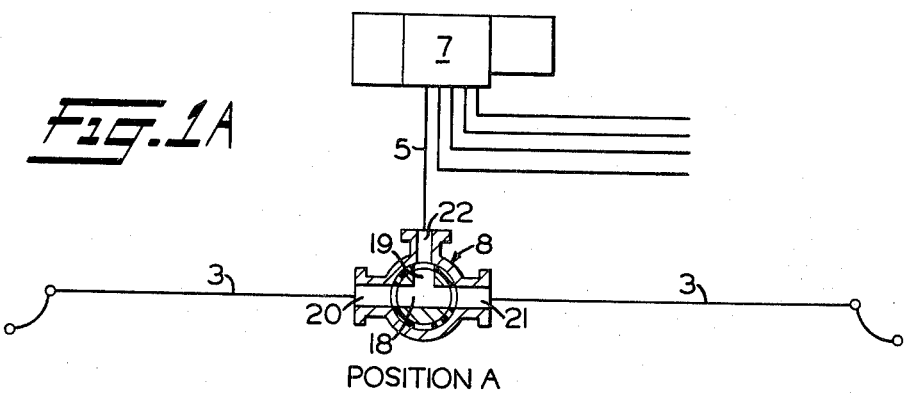
FIG. 1A is a schematic view, partly in section, showing a four-way ball type valve device embodying the invention and in its installed position relative to a brake pipe and a brake control valve device of a railway car.
Figure 1B:
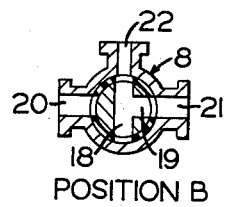
FIGS. 1B, 1C, and 1D, all in section, show the respective additional positions to which the four-way ball valve shown in FIG. 1A is operable.
Figure 1C:
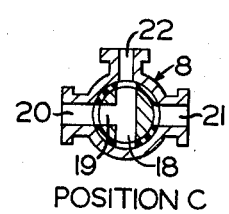
Figure 1D:
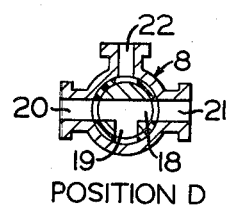
Figure 2:
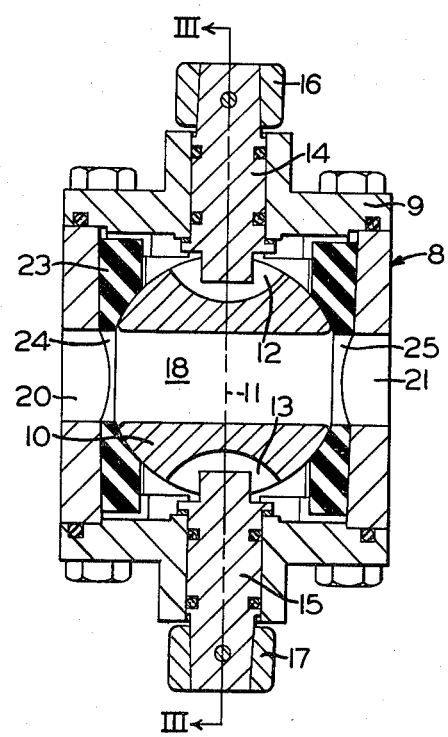
FIG. 2 is a plan view, in section and on a larger scale, of the four-way ball valve shown in FIGS. 1A, 1B, 1C, and 1D, taken along line II—II of FIG. 3 looking in the direction indicated by the arrows.
Figure 3:
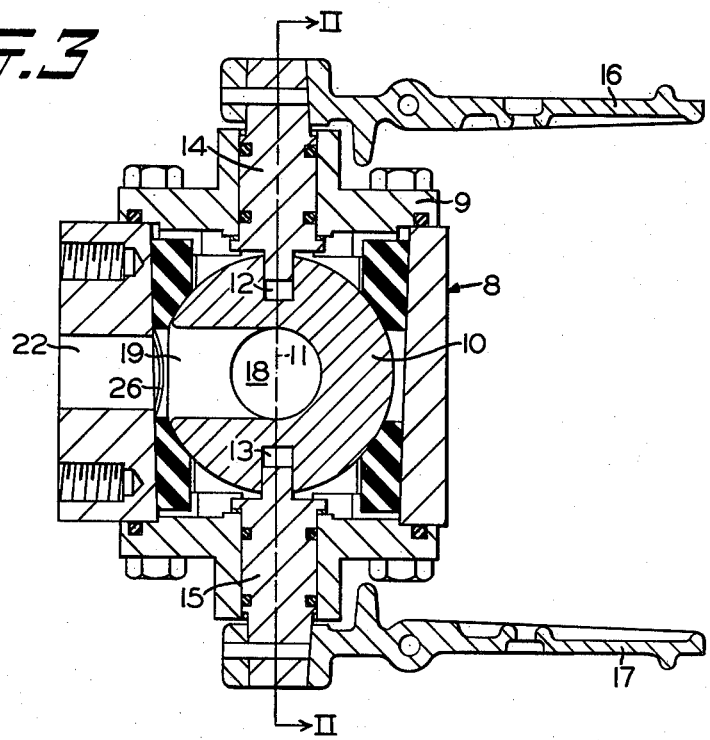
FIG. 3 is an end view, in section and on the same scale as FIG. 2, of the four-way ball valve shown in FIGS. 1A, 1B, 1C, 1D, and 2, taken along line III—III of FIG. 2 looking in the direction indicated by the arrows.

According to the invention and as shown in FIG. 1A, tee 6 in brake pipe 3 is replaced by a four-way ball type valve device 8, which is shown in detail in FIGS. 2 and 3. For purposes of convenience, ball valve device 8 is shown in FIG. 2 in a position rotated 90° from its normally installed position in brake pipe 3 and about the axis of said brake pipe.

Ball valve device 8, as seen in FIGS. 2 and 3, comprises a casing 9 in which a ball or spherically shaped valve member 10 is rotatable about a horizontal axis perpendicular to the brake pipe 3 or axis of the car (not shown) and indicated by the reference numeral 11. Valve member 10 is provided with diametrically oppositely disposed slots 12 and 13, each of which receives respective key portions 14 and 15 of a manually operable member comprising a pair of handles 16 and 17 extending parallel to the axis of the car and by which the valve device may be operated to several positions from either side of the car. See FIG. 3.

Ball valve member 10 is provided with a passageway 18 extending diametrically therethrough and a branch passageway 19 normal to and intersecting said passageway 18 (see FIGS. 1A, 1B, 1C and 1D).

Casing 9 is provided with three ports 20, 21, and 22, opposite ends of brake pipe 3 being connected to ports 20 and 21, while branch pipe 5 is connected to port 22, as shown in FIG. 1A. Ball valve member 10 is selectively operable, by one or the other of handles 16 and 17 to one of four positions shown in FIGS. 1A, 1B, 1C, and 1D and indicated in said views as positions A, B, C, and D, respectively. In position A of valve member 10, both ends of brake pipe 3 are connected to each other and to control valve device 7 via branch pipe 5; in position B, the left end of the brake pipe, as viewed in the drawing, is cut off while the right end is communicated with the control valve device; in position C, the right end of the brake pipe is cut off while the left end is communicated with the control valve device; and in position D, the two ends of the brake pipe are in communication and the control valve device is cut off.

The ball-shaped valve member 10 is sealingly disposed within a sealing element 23 disposed between said valve member and casing 9, said sealing element being made of a sealing material such as hard rubber, for example, and having an inner surface conforming to the spherical outer surface of said ball-shaped valve member. Sealing element 23 is provided with openings 24, 25, and 26 registering with ports 20, 21, and 22, respectively, of casing 9 to permit air flow therethrough when one or the other or both of passageways 18 or 19 are in such position as to be aligned with one or more of said openings.

Figure 4:
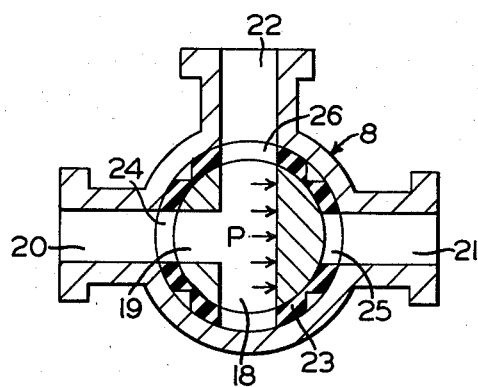
FIG. 4, is a sectional view, on a larger scale than FIG. 1A but smaller than FIGS. 2 and 3, of the four-way ball valve shown in FIGS. 1A, 1B, 1C, 1D, 2, and 3, showing the action of pressure therein.

The arrangement of ball valve member 10 within sealing element 23 utilizes a floating ball principle, that is, sufficient clearance is provided between the valve member and the sealing element to permit rotation of the valve member and to cause the valve member to be pressured by air pressure within the valve against the port or ports being cut off. For example, see FIG. 4 wherein the pressure in passageway 18 acts in the direction indicated by the plurality of arrows P to press valve member 10 tightly against sealing element 23 for effectively sealing off port 21 which is being cut off.

Having now described the invention, what I claim as new and desire to secure by Letters Patent, is:

1. A four-way ball type valve device for selectively controlling communication between two or more ports formed therein, said valve device comprising:

(a) a casing having at least three ports connectable to respective pipes;

(b) a ball-shaped valve member having a first passageway extending diametrically therethrough and a branch passageway normal to and intersecting said first passageway, said valve member being rotatably disposed in said casing and selectively operable to a plurality of positions in each of which positions fluid pressure is communicated between two or more of said ports via said passageways in said valve member; and (c) a sealing element sealingly disposed between said casing and said valve member and having at least three openings therein registering with said ports in the casing, said sealing element having an inner surface contour complementing the outer surface of the ball-shaped valve member and providing sufficient clearance therebetween for permitting snug rotating action of the valve member therein and sufficient displacement thereof, responsively to fluid pressure in said passageways, for applying sealing pressure of the valve member against the cut-off port when only two of said ports are in communication with each other.

2. A four-way ball type valve device, as set forth in claim 1, wherein said valve member is operable: (a) to a first position in which three of the ports are communicated with each other; (b) to a second position in which a first and second port are communicated with each other and the third port is cut off; (c) to a third position in which said first and third ports are communicated with each other and the second port is cut off; and (d) to a fourth position in which said second and third ports are communicated with each other and said first port is cut off.

3. A four-way ball type valve device, as set forth in claim 2, further characterized by manually operable handles operably disposed on opposite sides of the valve device for effecting operation of said valve member to its several positions, each of said handles being operable independently of the other.

* * * * *